(No Model.)
O. L. F. BROWNE.
APPARATUS FOR SEPARATING SOLID MATTER FROM LIQUIDS.
No. 283,373. Patented Aug. 21, 1883.
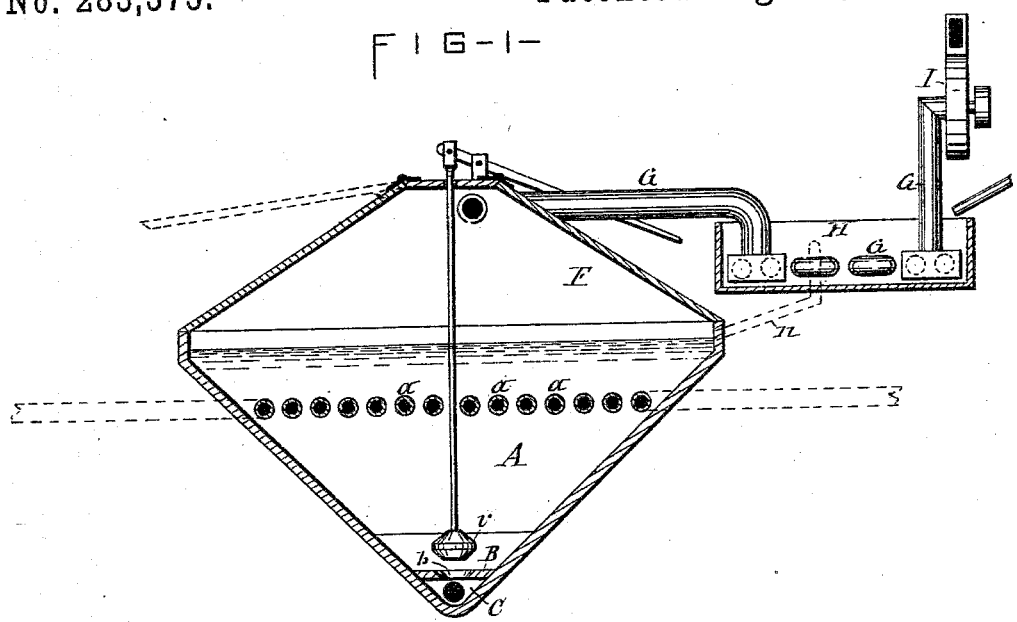
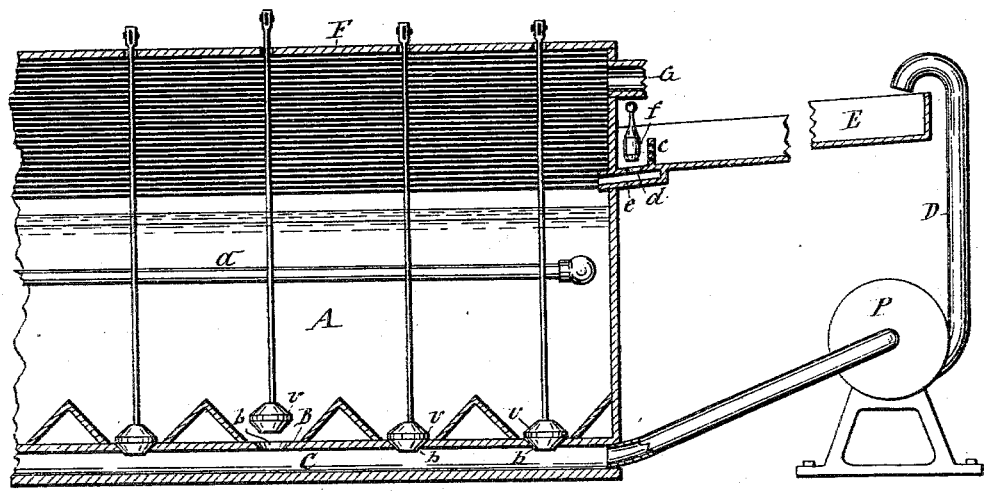
Witnesses—
Wm. C. Raymond
J. H. Gibbs
Inventor—
Oliver L. F. Browne
per Hull, Laass & Hey
his Attorneys

UNITED STATES PATENT OFFICE.

OLIVER L. F. BROWNE, OF SYRACUSE, NEW YORK.

APPARATUS FOR SEPARATING SOLID MATTER FROM LIQUIDS.

SPECIFICATION forming part of Letters Patent No. 283,373, dated August 21, 1883.

Application filed May 14, 1883. (No model.)

*To all whom it may concern:*

Be it known that I, OLIVER L. F. BROWNE, of Syracuse, in the county of Onondaga, in the State of New York, have invented new and useful Improvements in Apparatus for Separating Solid Matter from Liquids, of which the following, taken in connection with the accompanying drawings, is a full, clear, and exact description.

The object of this invention is to conveniently and expeditiously remove the sediment from evaporating-vessels or other receptacles designed for separating solid from liquid substances; and the invention consists, essentially, in the combination, with such vessel or receptacle, of a pump having its suction-pipe extended to and communicating with the base of the interior of said vessel or receptacle, irrespective of the manner of reaching the latter.

The invention also consists in a novel arrangement of a settling or draining tank receiving the substances extracted from the bottom of the evaporating vessel, and means for conveying the liquid from the settling or draining tank to the evaporating vessel or receptacle; and the invention furthermore consists in a novel construction of the evaporating-vessel specially adapted for the attainment of the object of the invention, all as hereinafter more fully described, and set forth in the claims.

In the accompanying drawings, Figure 1 is a transverse vertical section of my invention, and Fig. 2 is a longitudinal section of the same.

Similar letters of reference indicate corresponding parts.

A represents a salt-water-evaporating tank or vessel, which may be constructed of any suitable material, and heated either by steam-pipes *a a*, extended through the same below the water-line thereof, as shown, or by any other suitable and well-known means. The sides of said tank I prefer to construct converging toward the center of the bottom, so as to collect thereat the sediment or salt. A short distance above the junction of said convergent sides I provide the tank A with the bottom proper, B, thus forming a subjacent channel or duct, C, which communicates with the tank A through a port or ports, *b b*, in the bottom B, said ports being provided with a valve, *v*, by which to control the egress from the tank A to the duct C.

P represents a centrifugal pump having its suction-pipe connected to the duct C, so that the latter forms an extension of the suction-pipe; or the pump may be connected directly to the duct C, so that said duct constitutes the suction-pipe proper. The discharge-pipe D of the pump is extended to and communicates with a settling-tank or drainer, E, in the form of a tank, situated at an elevation relatively higher than the water-line of the evaporating-vessel A, and placed in a slightly-inclined position, as shown in Fig. 2 of the drawings, the lower end of said tank being provided with a discharge-opening, *d*, at or near the bottom, and from said opening a conduit, *e*, leads to the evaporating-vessel A, a valve or plug, *f*, being applied to the opening *d* for controlling the egress. Back of the aforesaid opening there is a perforated partition, *c*, extended across the tank E and part way the height thereof, said partition serving to retard the escape of the substance introduced into the tank by the pump P, and detaining the same sufficiently to allow the solid substance to precipitate the supernatant liquid flowing over the top of the partition and passing through the opening *d*, from whence it is conveyed to the evaporating-tank A by the conduit *e*. The perforations in the partition allow the liquid to drain out of the solid substance.

The before-described appliances, when used in connection with a salt-water-evaporating apparatus, operate as follows: The salt-water being introduced in the tank A and evaporated by artificial heat obtained from the steam-pipes *a a*, or otherwise, causes the salt-crystals to be precipitated to the bottom B. When they have accumulated thereat sufficiently to require removing, the proper valve, *v*, is lifted to allow the salt to escape into the subjacent duct C, from whence it is drawn and conveyed to the drainer E by the pump P. In the drainer E the liquid is drained from the salt, the latter being retained in the drainer, and the eliminated liquid conveyed back to the evaporating-vessel, in the manner hereinbefore described.

It is obvious that the salt can readily be removed from the drainer when desired.

It will be observed that by means of the described appliances I am enabled to take the salt out of the evaporating-vessel as rapidly as it is formed, and in a most convenient manner, obviating the danger and unpleasant task of approaching the open top of the vessel containing boiling brine and emitting volumes of steam. It is especially adapted for evaporating-vessels provided with a cover, F, as represented in the annexed drawings, as in such cases the access to the top of the evaporating-vessel is very difficult, and in some instances impossible.

To the cover F, I connect a vapor-duct, G, which passes in a sinuous or serpentine course through a tank, H, and has connected to its extremity an exhaust-fan, I, to draw the vapor from the cover, the tank H being filled with crude brine, which, by the heat from the vapor-duct, is reduced to saturation, at which stage its impurities become precipitated, the upper pure stratum of the brine being conducted to the evaporating-vessel by a suitable conduit, $n$, as represented by dotted lines in Fig. 1 of the drawings, thus utilizing the heat of the vapor emitted from the brine in process of being reduced to salt.

Having described my invention, what I claim as new, and desire to secure by Letters Patent, is—

1. The combination, with a liquid-reducing tank or vessel, of a pump having its suction-pipe extended to and communicating with the base of the interior of said tank or vessel, substantially as and for the purpose set forth.

2. The combination, with an evaporating tank or vessel, of a duct communicating with the base thereof, and a drainer communicating with said duct and arranged to separate the solid from the liquid matter, as set forth.

3. The combination, with an evaporating-tank, of a port or ports tapping the base of said tank, a subjacent duct, a draining-receptacle arranged to receive the delivery of the duct and to separate the solid from the liquid matter, substantially as shown and set forth.

4. The combination, with an evaporating-tank, of a port or ports tapping the base of said tank, a subjacent duct, a draining-receptacle arranged to receive the delivery of the duct and to separate the solid from the liquid matter, and a conduit arranged to convey the liquid to an evaporating-tank, as specified.

5. The combination, with an evaporating tank or vessel, of a subjacent duct communicating with the bottom of the interior of said tank or vessel, a drainer or settling tank for separating the solid matter from the liquid, and means for elevating and conveying the liquid back to the evaporating tank or vessel.

6. The combination, with an evaporating-tank, of a port or ports tapping the base thereof, and provided with a valve, a duct in communication with said ports, a pump connected with the duct, a draining-tank arranged to receive the delivery of the pump and separate the solid from the liquid matter, and a conduit for conveying the liquid to the evaporating-tank, substantially as set forth.

7. The combination, with an evaporating-tank, of a port or ports tapping the base thereof, and provided with a valve, a duct communicating with said ports, a draining-tank situated relatively higher than the water-line of the evaporating-tank, and provided with an overflow, a conduit from the overflow to the evaporating-tank, and a pump arranged to convey the contents of the lower duct to the draining-tank, substantially as described and shown.

8. The combination of an evaporating-tank having sides converging toward the bottom, a port or ports tapping the said bottom, a duct extended from said ports, and a draining or settling tank arranged to receive the contents of the duct, substantially as set forth and shown.

9. The combination, with an evaporating tank or vessel, of a cover applied to the top thereof, discharge-openings in the bottom of the same, a settling-tank for the collection of the discharge, and a pump for returning the liquid from said tank to the evaporating-vessel, substantially as described and shown.

10. In combination with the evaporating-tank, a cover over said tank, a vapor-duct, and a brine saturating and purifying tank heated by said vapor-duct, as shown, a port or ports tapping the base of the evaporating-tank, valves applied to said ports, a duct communicating with the ports, and a drainer or settling-tank connected with said duct, substantially as shown and set forth.

In testimony whereof I have hereunto signed my name and affixed my seal, in the presence of two attesting witnesses, at Syracuse, in the county of Onondaga, in the State of New York, this 2d day of May, 1883.

OLIVER L. F. BROWNE. [L. S.]

Witnesses:
FREDERICK H. GIBBS,
WILLIAM C. RAYMOND.